United States Patent [19]
Dupuy

[11] Patent Number: 5,396,733
[45] Date of Patent: Mar. 14, 1995

[54] SEAL ASSEMBLY FOR A MOVABLE WINDOW FOR A VEHICLE

[75] Inventor: Ronald E. Dupuy, Wabash, Ind.
[73] Assignee: GenCorp Inc., Fairlawn, Ohio
[21] Appl. No.: 74,253
[22] Filed: Jun. 9, 1993
[51] Int. Cl.⁶ .............................................. E06B 7/22
[52] U.S. Cl. ....................................... 49/441; 49/377; 49/479.1
[58] Field of Search ...................... 49/441, 440, 479.1, 49/502, 377, 376, 378

[56] References Cited

U.S. PATENT DOCUMENTS

| | | |
|---|---|---|
| 2,223,459 | 12/1940 | Reid . |
| 3,807,978 | 4/1974 | Niemanns ................ 49/441 |
| 4,809,463 | 3/1989 | Schroder et al. . |
| 4,833,847 | 5/1989 | Inayama et al. . |
| 4,894,954 | 1/1990 | Nozaki et al. .................... 49/441 X |
| 4,920,699 | 5/1990 | Nagata et al. ......................... 49/441 |
| 4,949,507 | 8/1990 | Vaughan . |
| 5,001,876 | 3/1991 | Harper et al. . |
| 5,009,462 | 4/1991 | Katcherian . |
| 5,067,281 | 11/1991 | Dupuy . |
| 5,083,832 | 1/1992 | Ohya . |
| 5,086,588 | 2/1992 | Nakano et al. ........................ 49/441 |

FOREIGN PATENT DOCUMENTS

| | | |
|---|---|---|
| 0258599A | 3/1988 | European Pat. Off. . |
| 0385028 | 9/1990 | European Pat. Off. . |
| 0476874A | 3/1992 | European Pat. Off. . |
| 0512673A | 11/1992 | European Pat. Off. . |
| 94304175 | 9/1994 | European Pat. Off. . |

*Primary Examiner*—Philip C. Kannan
*Attorney, Agent, or Firm*—Robert F. Rywalski; Daniel J. Hudak

[57] ABSTRACT

A seal assembly for a movable window pane which is raisable or lowerable in a vehicle window opening includes a one-piece, closed-loop construction which is formed from two molded sealing elements secured together to form a sealing member adapted to be secured along the periphery of a window opening and to provide continuous sealing engagement with the interior and exterior periphery of the movable window pane. The one-piece seal assembly replaces a plurality of individual sealing components which are conventionally used to provide the weather seal between a vehicle window opening and a movable window pane which slides up or down to open or close the window opening.

A method for forming a one-piece, closed-loop seal assembly includes the steps of molding an inner sealing element having a continuous, closed-loop structure, molding an outer sealing element having a continuous, closed-loop structure, and then securing the sealing elements together to form a one-piece, closed-loop sealing member adapted to seal between a vehicle window opening and a window pane which can be raised or lowered within the opening.

10 Claims, 6 Drawing Sheets

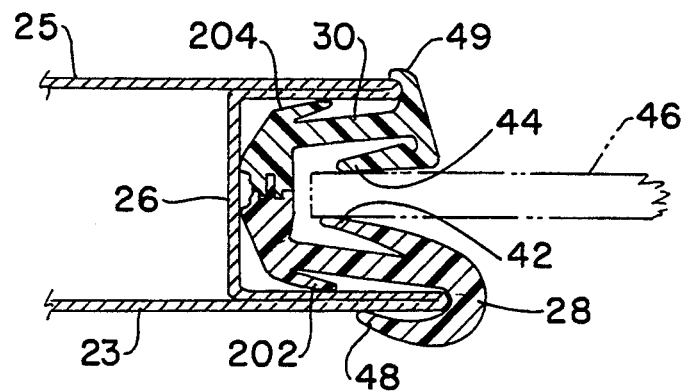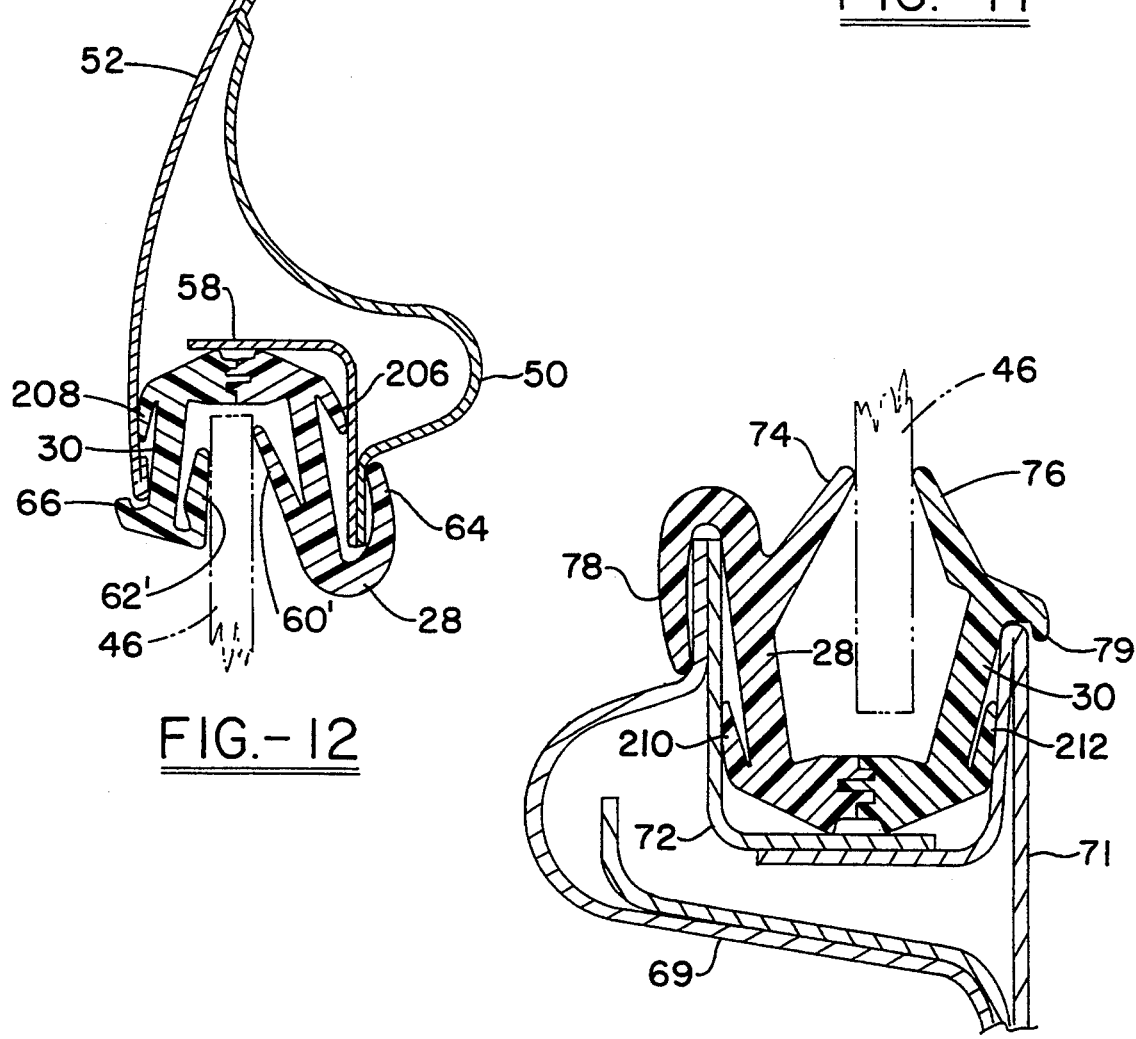

SEAL ASSEMBLY FOR A MOVABLE WINDOW FOR A VEHICLE

FIELD OF THE INVENTION

The invention relates to a weather seal assembly for movable window panes in automotive vehicles. More particularly, the invention relates to a unitary, closed-loop seal assembly which provides continuous sealing engagement with both the interior and exterior periphery of a movable window pane of a vehicle door. The invention also relates to a method of molding a unitary closed-loop seal assembly having interior and exterior sealing elements which cooperatively provide continuous sealing engagement about both the interior and the exterior periphery of a movable window pane of a vehicle door.

BACKGROUND OF THE INVENTION

Conventional seals for movable window panes in automotive vehicles generally include a plurality of individual sealing strips including, for example, individual glass runs, header, and inner and outer beltstrips. The assembly process for conventional movable window seals is generally cumbersome and time consuming, requiring the separate sequential attachment of each individual sealing strip to the window opening of the vehicle. In addition, the use of a plurality of individual sealing strips to seal a single window opening often results in gaps between adjacent edges of individual sealing strips. Gaps between adjacent sealing strips are undesirable because they are aesthetically unpleasing, and can often allow water and air leakage, along with the noise and draftiness associated with air leakage.

Another disadvantage with conventional seals for movable window panes in automotive vehicles is that the sealing strips are generally extruded and therefore have a constant cross sectional shape and size, thereby effectively restricting the contours of doors utilizing such sealing strips to relatively simple geometric structures which are substantially free of offsets, indentations, and the like in the window opening.

The dimensional reproducibility of extruded articles is also unfavorable, with typical dimensional variations being about ±4 percent. Variations of this magnitude can result in unsightly discontinuities between adjacent installed sealing strips, and can lead to waste due to the rejection of sealing strips having intolerable dimensional variations.

In addition to assembly problems which result in high labor expenditures and problems relating to gaps in the assembled seal, a relatively large number of steps are required during the production and handling of all of the individual sealing strips, especially when the individual sealing strips required for a window opening are different from one another.

U.S. Pat. No. 4,809,463 to Schroder et al. discloses a window frame for movable windows in automotive vehicles. The frame is an extruded rubber profile comprising a pair of sealing strips which are connected as one piece by a connecting bridge which rests against the edge of a window. The connecting bridge is separated from the sealing strip in the region of the lower edge of the window cutout to enable passage of the movable window pane. The window frame has ends which are butted and butt vulcanized, thereby eliminating gaps in the seal. The window frame disclosed by Schroder et al., however, has substantially all of the other disadvantages associated with extruded sealing strips, including limitations relating to constant cross sectional shape and size, and relatively high dimensional variations. In addition, the butt vulcanized joint will tend to have an unpleasant appearance. The frame and seal assembly of Schroder et al., like other extruded weather sealing strips, are not readily adaptable to accommodate complex window contours having offsets, indentations and the like.

Accordingly, a weather seal assembly having a continuous closed-loop structure which is free of gaps and which does not require any butt vulcanizing or other jointing steps during installation, thereby simplifying manufacturing and installation while providing a better appearance and allowing for adaptation to complex window contours, would be highly desirable.

SUMMARY OF THE INVENTION

In accordance with the invention, a weather seal assembly for a movable window of a vehicle has been provided which overcomes the disadvantages of the prior art. The seal comprises a one piece, continuous, closed-loop sealing strip which is free of any discontinuities and which does not require any jointing operations, such as butt vulcanization, to complete installation of the seal assembly onto a window opening of an automotive vehicle door. The seal assembly, therefore, replaces the plurality of individual sealing strips such as pillar or glass run sealing strips, header or top run sealing strips, and inner and outer beltline sealing strips, which are typically utilized, thereby simplifying and reducing the number of steps required to manufacture and install the window seals. Because the seal assembly of the invention utilizes a single continuous loop which is adapted to be secured along the periphery of a window opening, procurement, inventory, and handling procedures are also simplified. The absence of gaps in the sealing assembly provides for a more aesthetically pleasing appearance, eliminates draftiness and noise associated with air leakage, and eliminates water leakage.

In accordance with an important aspect of the invention, the seal assembly is a molded article as opposed to an extruded article, thereby providing a seal assembly having an improved appearance and eliminating the problems associated with extruded sealing strips. In particular, molded articles exhibit improved production repeatability when compared with extruded articles. Dimensional variations for molded articles are typically about ±0.05 percent as opposed to about ±4 percent for extruded articles. Accordingly, the molded seal assemblies of the invention are expected to have a more consistent high quality appearance, substantially free of significant dimensional variations. In addition, consistent production repeatability is expected to result in reduced waste on account of fewer rejections based on intolerable dimensional variations. Another advantage of the molded weather seal assemblies of the invention is that they can be molded into more complicated shapes than are possible with extruded weather sealing strips, thereby providing a simple but effective means for weather sealing vehicle window openings having relatively complicated contours including offsets, indentations and the like.

In accordance with a preferred aspect of the invention, the seal assemblies can be molded from thermoplastic elastomers such as EPDM to which pigment can be added thereby allowing for the fabrication of various colored seal assemblies which can be color coordinated with the exterior body panels of a vehicle.

The seal assembly of the invention is preferably fabricated by molding a continuous, closed-loop inner sealing element and a continuous, closed-loop outer sealing element, and then securing the inner and outer molded sealing elements together to form a unitary, continuous, closed-loop sealing assembly for weather sealing between a window opening of a vehicle and the periphery of a movable window pane which can be raised to close the window opening. The sealing assembly is adapted to be secured to the periphery of a vehicle window opening with the interior and exterior elements cooperating to provide continuous sealing engagement with the interior and exterior periphery of a movable window pane.

In accordance with another preferred aspect of the invention, the seal assembly is fabricated in an injection press with a horizontally opening platen. The mold has an inner seal die which together with a removable divider plate defines an inner seal mold cavity, and an outer seal die which together with the removable divider defines an outer seal mold cavity. The material used to form the seal elements is preferably a thermoplastic elastomeric material such as EPDM rubber. The seal assembly is formed by positioning the dies in the closed position with the removable divider sandwiched between the inner and outer seal dies, then simultaneously injecting a thermoplastic elastomeric material into the inner and outer seal mold cavities to form the inner and outer sealing elements. After the inner and outer sealing elements have been formed, the mold is opened and the divider plate is removed. Adhesive materials are then applied to selected surfaces of the inner sealing elements, outer sealing element, or both. Optionally, a flock adhesive and flock may be selectively applied to surfaces which are designed to resiliently and slidably engage and seal against a window pane. The mold is then again closed without the divider between the inner and outer seal dies and optionally heat is applied to bond the inner and outer sealing element together into a one piece sealing assembly. The mold is once again opened and the finished seal assembly is removed. Alternatively, instead of flocking, a conventional low friction coating can be applied to the selected surfaces designed to engage the window pane in order to reduce friction between the seal assembly and the window pane. The foregoing fabrication process permits concurrent molding of both an inner sealing element and an outer sealing element, and subsequent bonding of the inner and outer sealing elements in a single molding apparatus.

BRIEF DESCRIPTION OF THE FIGURES

FIG. 11 is a cross-sectional view of the A-pillar side portion of an alternative preferred embodiment;

FIG. 12 is a cross-sectional view of the header portion of the alternative preferred embodiment; and FIG. 13 is a cross-sectional view of the B-pillar side portion of the alternative preferred embodiment.

DESCRIPTION OF THE PREFERRED EMBODIMENT

The invention will now be described with reference to its application in a typical front seat door having a movable window pane, i.e. a raisable and lowerable sliding window pane. It will, however, be readily understood by those skilled in the art that the features and principles of the invention are generally applicable to a variety of sliding window panes requiring weather seals, including various passenger side doors or back doors having movable windows with similar or different shaped window openings, such as complicated window opening contours having offsets indentations and the like.

Figure 1:
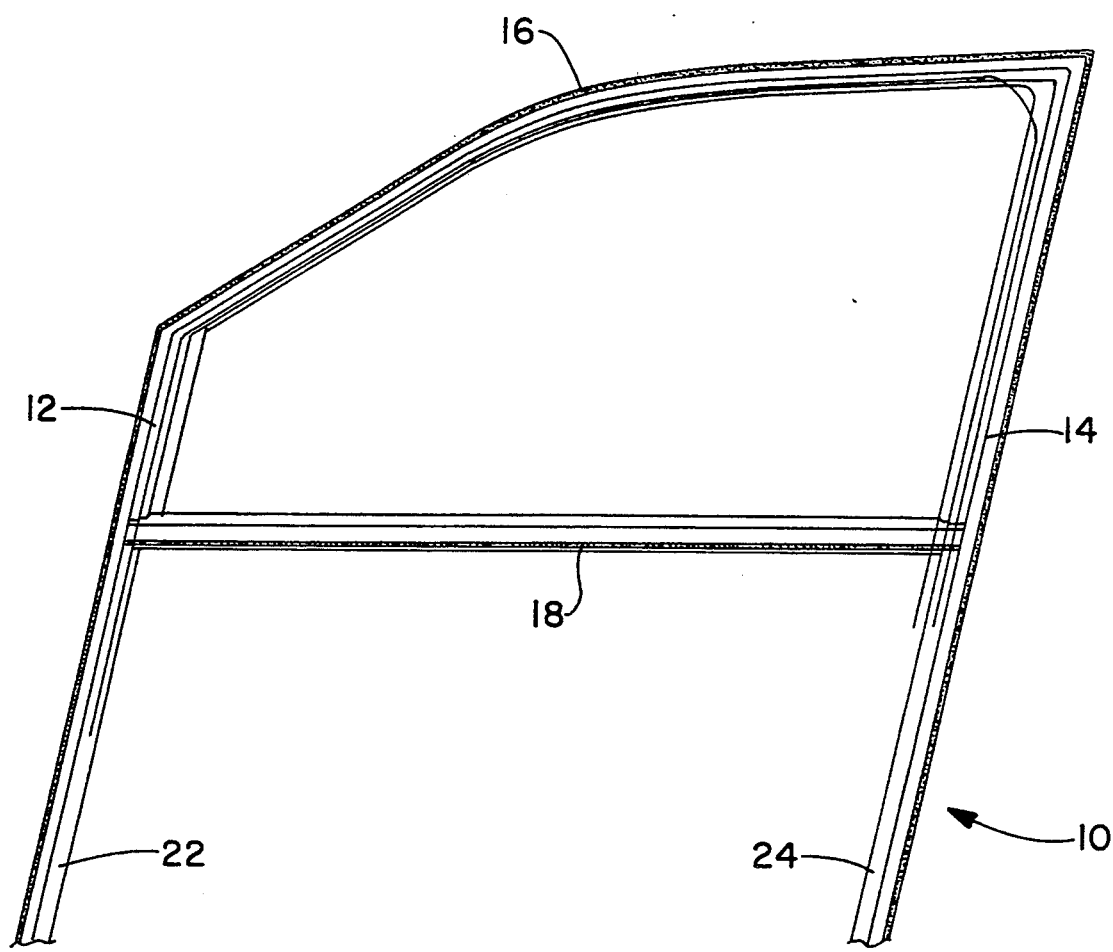
FIG. 1 is an elevational view of a particular preferred embodiment of the invention.

An elevational view facing the outboard side of a seal assembly in accordance with the principles of the invention is shown in FIG. 1. The seal assembly 10 is a one piece construction having a pair of laterally spaced side portions 12 and 14, a header portion 16, and a pair of parallel spaced opposing beltline sealing strips 18 and 20 (shown in FIG. 5) which connect the A-pillar side portion 12 with the B-pillar side portion 14. The outer beltline sealing strip 18 is spaced from the inner beltline sealing strip 20 (see FIG. 5) to define an opening through which a movable window pane can be raised or lowered. The side portions 12 and 14 together with the header portion 16 and beltline sealing strips 18 and 20 define an opening which substantially coincides with the window opening of a vehicle in which the seal assembly is to be utilized. The seal assembly is formed of a resilient elastomeric material preferably having low friction surfaces which slidingly and sealingly engage the peripheral surfaces of a movable window pane. The seal assembly can also include a pair of downwardly depending glass run extensions 22 and 24 which are adapted to be secured to the internal window pane guides of a vehicle door having a movable window pane. The extensions 22 and 24 are not generally provided for weather sealing purposes but instead serve as nonabrasive, low-friction guide liners for promoting smooth movement of the movable window pane as it is being raised or lowered. Accordingly, the extensions 22 and 24 can be formed as separate pieces without departing from the main purpose of the invention which is to provide a seal assembly which is sealingly secured along the periphery of a window opening and which has interior and exterior sealing elements providing continuous sealing engagement with both the interior and exterior periphery of a movable window pane.

Figure 2:
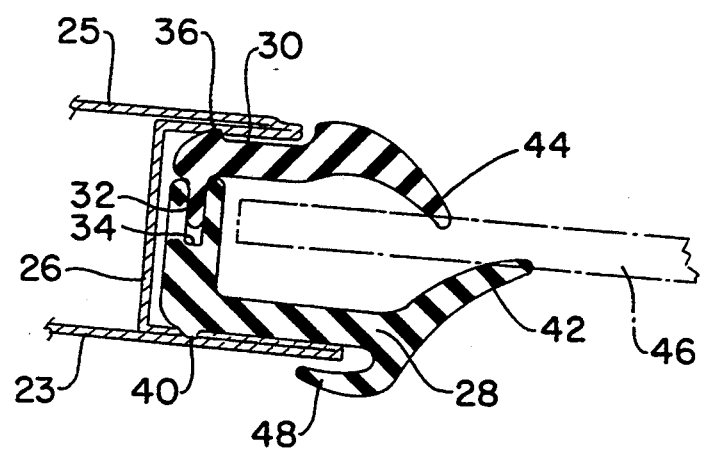
FIG. 2 is a cross sectional view of the A-pillar side portion of the seal assembly installed in the window opening of a vehicle door.

A cross section of the A-pillar side portion 12 of the seal assembly 10 installed in the window opening of a vehicle door is shown in FIG. 2. As is well known in the art, the window opening of a vehicle door is typically defined along the top and sides of the window opening by a substantially continuous U-shaped channel which is rigidly secured either directly or indirectly to both the door frame and to inner 23 and outer door panel parts 25. The U-shaped channels such as channel 26 serve as rigid underlying guide means for the movable window pane and as retaining means for the seal assembly which is generally secured to the U-shaped channels and interposed between the channels and the movable window pane. In accordance with the preferred embodiment, the seal assembly is fabricated from an integrally formed, closed-loop inner sealing element 28 and an integrally formed closed-loop outer sealing element 30 which are securely bonded together to form a unitary seal assembly. A preferred means for securing the sealing elements is to provide one of the sealing elements with a projecting ridge 32 which fits snugly into or mates with a deep groove or furrow 34 in the other sealing element. The ridge 32 and furrow 34 are each preferably continuous about the closed-loop of the respective sealing elements and when mated provide an interference fit which secures the sealing elements together. The sealing elements can also be secured or further secured to each other such as by thermal fusion or by applying adhesives to the mating surfaces of the ridge and/or furrow before mating the sealing elements.

Various conventional means, such as camming projections 36 and 40 which allow the seal assembly to be pushed into the channel 26 and engage holes or slots in the channel to lock the seal assembly in place by means of a stop comprising a flat surface on the camming projection which is at approximately a right angle to the trailing edge of the camming surface, can be utilized to secure the seal assembly to the periphery of the window opening.

As shown in FIG. 2, the A-pillar portion of the inner sealing element 28 and outer sealing element 30, respectively, have projecting portions 42 and 44 with surfaces which resiliently and slidingly engage and seal interior and exterior surfaces of the window pane 46, respectively. Additionally, a transition portion 48 is provided to aid in concealing spot or pinch welds between and/or on the inner door panel 23 and the U-shaped channel 26, and/or to provide an aesthetically pleasing smooth transition between the seal assembly and the inner panel part 23.

Figure 3:
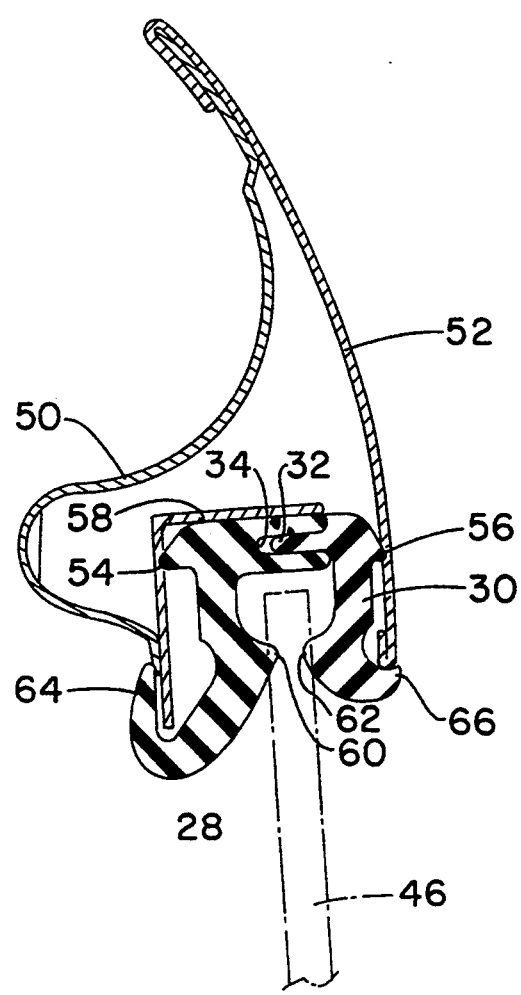
FIG. 3 is a cross sectional view of the header portion of the seal assembly installed in the window opening of a vehicle door.

A cross section of the header portion 16 of the seal assembly 10 installed in the window opening of a vehicle door is shown in FIG. 3. The details of the header portion 16 are generally similar to those of the A-pillar side portion 12. A L-shaped member 58 serves as a rigid underlying structure and support means for the header portion 16 of the seal assembly 10. Suitable means for securing the seal assembly to the header portion of the window opening include camming projections 54 and 56 which are generally functionally and structurally similar to camming projections 36 and 40 and which engage slots or holes in the parts 58 and 52, respectively. The inner sealing element 28 is preferably secured to the outer sealing element 30 by means of a projecting ridge 32 and furrow 34 in combination with fusion or adhesives as previously disclosed. The header portion of the inner sealing element 28 and outer sealing element 30, respectively, have projecting portions 60 and 62 with surfaces which resiliently and slidingly engage and seal interior and exterior surfaces, respectively, of the upper periphery of the movable window pane 46. Transitional portions 64 and 66 provide a smooth, aesthetically pleasing transition between the seal assembly and the inner panel part 50 and the outer panel part 52, respectively.

Figure 4:
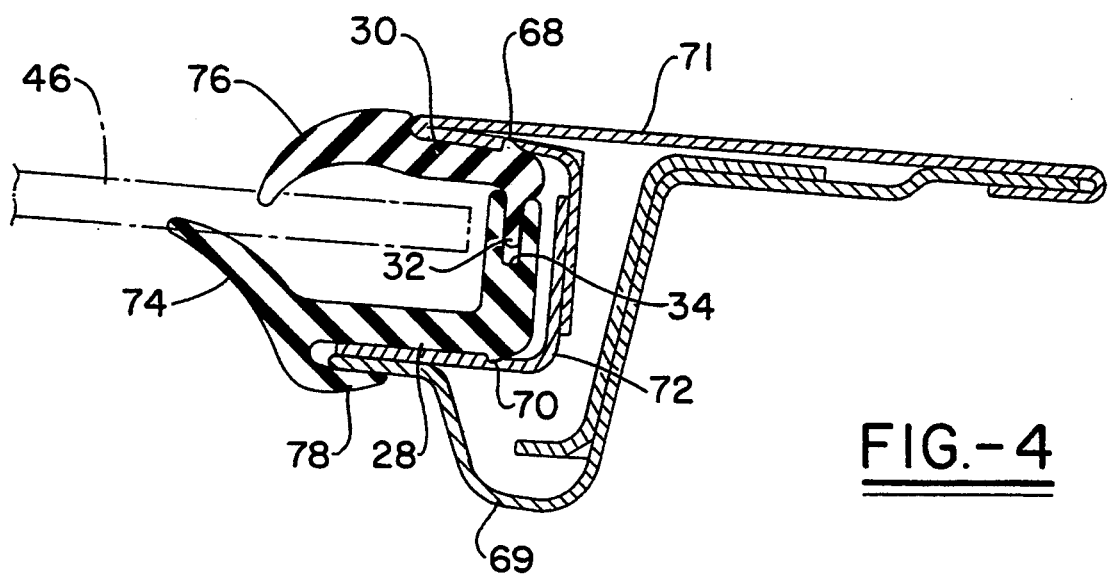
FIG. 4 is a cross sectional view of the B-pillar side portion of the seal assembly installed in the window opening of a vehicle door.

The details of the B-pillar portion 14 of the seal assembly are both structurally and functionally similar to those of the A-pillar portion. FIG. 4 is a cross section of the B-pillar side portion of the seal assembly 10 installed in the window opening of a vehicle door. A U-shaped channel 72 serves as a rigid underlying structure and support means for the B-pillar side portion 14 of the seal assembly 10. The U-shaped channel 72 is firmly secured as by welding or other conventional techniques to the door structure such as to inner door panel part 69 and outer door panel part 71. Conventional means such as camming projections 68 and 70 can be utilized for securing the seal assembly to a U-shaped channel 72. The inner sealing element 28 is preferably secured to the outer sealing element 30 by means of a projecting ridge 32 which is snugly received within a furrow 34. Adhesives or fusion are preferably utilized to firmly secure the sealing elements 28 and 30 together. The B-pillar portion of the inner sealing element 28 and outer sealing element 30, respectively have projecting portions 74 and 76 with surfaces which resiliently and slidingly engage and seal interior and exterior surfaces, respectively, of the window pane periphery. A transitional portion 78 provides a smooth, aesthetically pleasing transition between the seal assembly and the inner panel part 69.

Figure 5:
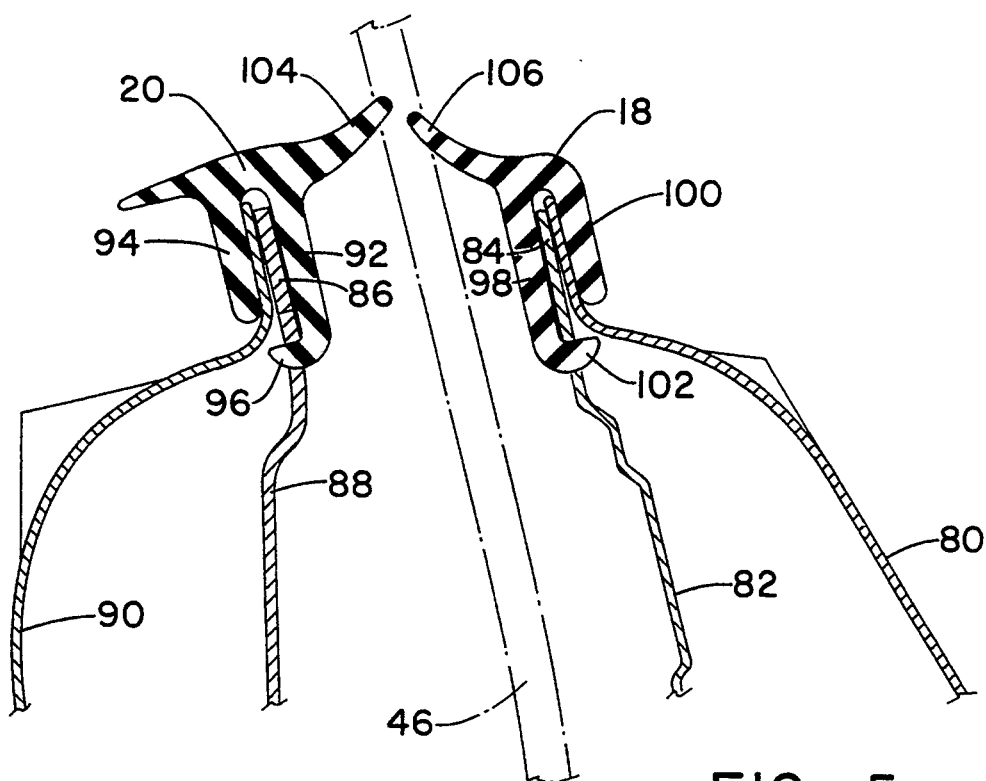
FIG. 5 is a cross sectional view of the inner and outer beltline sealing strips of the seal assembly installed in the window opening of a vehicle door.

The details of the outer beltline sealing strip 18 and the inner beltline sealing strip 20 are shown in cross section in FIG. 5, wherein the outer beltline sealing strips 18 of the seal assembly is shown secured to a typical vehicle door assembly having an outer show panel 80 secured along its top edge to an internal outboard panel 82 to form a flange 84 and wherein the inner beltline sealing strip 20 is shown secured to a flange 86 formed by securing the top edge of an internal inboard panel 88 to the top edge of an inner door panel 90. The internal outboard panel 82 and the internal inboard panel 88 are laterally spaced to generally define a volume into which the movable window can be at least partially concealed when the window is lowered by conventional door window regulator means. The inner and outer beltline sealing strips are adapted to be secured to flanges 86 and 84, respectively. The inner beltline sealing strip 20 has a pair of downwardly depending wall portions 92 and 94 which are spaced to securely received flange 86 therebetween. The seal assembly is further secured along the inner beltline to the flange 86 by a plurality of hook-like extensions 96 of wall 92. Similarly, the outer beltline sealing strip 18 has a pair of downwardly depending wall portions 98 and 100 which are spaced to securely receive flange 84 therebetween. The seal assembly is further secured along the outer and inner beltlines to the flanges 84 and 86, respectively, by a plurality of hook extensions 102 and 96 of walls 98 and 92, respectively, which engage holes or slots in flanges 84 and 86, respectively, along the bottom of a window opening. The inner and outer beltline sealing strips, respectively, have projecting portions 104 and 106 with surfaces which resiliently and slidingly engage and seal interior and exterior surfaces, respectively, of the window pane.

Figure 6:
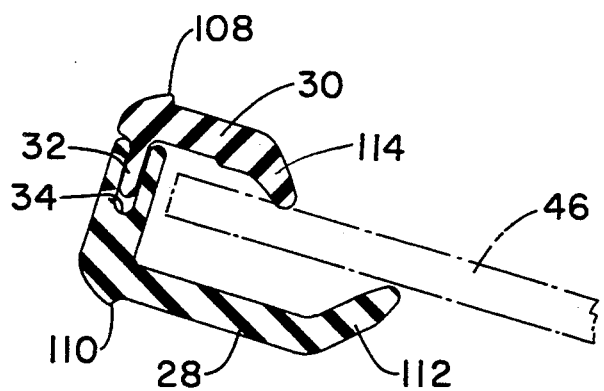
FIG. 6 is a cross sectional view of an optional downwardly depending glass run extension of the seal assembly installed in the window opening of a vehicle door.

The cross sectional details of the optional downwardly depending glass run extensions 22 and 24 are substantially mirror images of one another and will therefore be described only with reference to extension 22 shown in FIG. 6. The extensions 22 and 24 are adapted to be received in generally U-shaped channels substantially similar to channel 26 shown in FIG. 2. The extensions are secured to the U-shaped channels by means of camming projections 108 and 110 which are structurally and functionally similar to the camming projections 36 and 40. As with the A-pillar side portion 12, header portion 16, and B-pillar side portion 14 of the seal assembly 10, the inner sealing element 28 is preferably secured to the outer sealing element 30 by means of a projecting ridge 32 which is securely received within a furrow 34. Firm securement of the sealing elements 28 and 30 to each other is preferably supplemented with adhesives or by fusing the elements together. The extension portions of inner element 28 and outer element 30, respectively, have projecting portions 112 and 114 with surfaces which resiliently and slidingly engage interior and exterior peripheral surfaces, respectively, of the window pane 46 to provide for smooth movement of the window pane along the generally U-shaped channels 26 and 72 which guide the window pane as it is raised or lowered.

There is shown in FIGS. 11-13 an alternative preferred embodiment of the invention. The sealing elements of the alternative embodiment are generally similar to the first preferred embodiment and differ primarily in the means by which they are secured to the door panel parts. Accordingly, parts similar to those of the first preferred embodiment, as shown in FIGS. 1-6, are similarly numbered.

The A-pillar portion of the alternative preferred embodiment of the invention has an inner and outer sealing element 28 and 30, respectively, shown in FIG. 11. The inner sealing element 28 and outer sealing element 30, respectively, have projecting portions 42 and 44 with surfaces which resiliently and slidingly engage the seal interior and exterior surfaces of the window pane 46, respectively. The projecting portions 42 and 44 can project away from the edge of the window pane 46, such as is shown in FIG. 2, or toward the edge of the window pane, as shown in FIG. 11. A transition portion 48 can be provided to conceal spot or pinch welds between and/or on the inner door panel 23 and the U-shaped channel 26, and/or to provide an aesthetically pleasing smooth transition between the seal assembly and the inner panel part 23. A second transition portion 49 can also be provided on outer sealing element 30 to provide an aesthetically pleasing smooth transition between the seal assembly and the outer door panel part 25.

As with the first preferred embodiment, the alternative preferred embodiment of the seal assembly is fabricated from an integrally formed, closed-loop inner sealing element 28 and an integrally formed closed-loop outer sealing element 30 which are securely bonded together to form a unitary seal assembly. The inner and outer sealing elements can be secured to one another in any conventional manner such as previously described with respect to the first preferred embodiment. As shown in FIG. 11, a plurality of mating ridges and furrows, resembling a square wave, can be used to provide an interference fit which secures the sealing elements together.

In accordance with the alternative embodiment of the invention, the inner and outer sealing elements 28 and 30, respectively, are provided with fingers 202 and 204 which are resiliently biased substantially outwardly away from the plane of the window opening in substantially opposite directions toward the opposing sides of channel member 26 to secure the seal assembly within the channel by means of frictional engagement and/or an interference fit with the channel member, thereby facilitating easy installation without the need for retaining clips or slots in the channel member.

A cross-section of the header portion 16 of the seal assembly 10 of the alternative preferred embodiment of the invention is shown in FIG. 12. The details of the header portion 16 are generally similar to those of the first preferred embodiment, shown in FIG. 3, the primary difference being the means by which the seal assembly is secured to the inner and outer door panel parts 50 and 52, respectively.

As with the A-pillar portion of the assembly, various conventional means can be used to secure the outer sealing element 30 to the inner sealing element 28 along the header portion. Such means, as previously described, include fusion, adhesion, and interference fit or a combination thereof.

The header portion of the inner sealing element 28 and outer sealing element 30, respectively, have projecting fingers 60' and 62' with surfaces which resiliently and slidingly engage and seal interior and exterior surfaces, respectively, of the upper periphery of the movable window pane 46. The fingers 60' and 62' can project toward the edge of the window opening, as shown in FIG. 12, away from the window opening (in a manner analogous to that of projecting portions 42 and 44 shown in FIG. 2), or substantially perpendicular to the glass pane (in a manner similar to projecting portions 60 and 62 shown in FIG. 3), so long as the fingers or projecting portions are effective at resiliently and slidingly engaging and sealing along the periphery of the window pane. Transitional portions 64 and 66 provide a smooth, aesthetically pleasing transition between the seal assembly and the inner panel part 50 and the outer panel part 52, respectively.

In accordance with the alternative embodiment of the invention, the inner and outer sealing elements 28 and 30, respectively, are provided with fingers 206 and 208 which are resiliently biased outwardly away from the plane of the window pane in opposite directions toward the opposing door panel parts 58 and 52, respectively, to secure the seal assembly to the window opening along the header portion by means of frictional engagement and/or an interference fit, thereby facilitating easy installation without the need for retaining clips or slots in the parts 58 and 52.

The details of the B-pillar portion 14 of the seal assembly of the alternative preferred embodiment are similar to those of the A-pillar portion, and are shown in FIG. 13. A U-shaped channel 72 serves as a rigid underlying structure and support means for the B-pillar side portion 14 of the seal assembly. The U-shaped channel 72 is fixedly secured to the door structure as to inner door panel part 69 and outer door panel part 71 as by welding or other conventional means. Various means, as previously described, can be used for securing the outer sealing element 30 to the inner sealing element 28 along the B-pillar portion of the seal assembly. The B-pillar portion of the inner sealing element 28 and outer sealing element 30, respectively, have projecting portions 74 and 76 with surfaces which resiliently and slidingly engage and seal interior and exterior surfaces, respectively, of the periphery of the window pane 46. Transitional portions 78 and 79 provide a smooth, aesthetically pleasing transition between the seal assembly and the inner panel part 69. The inner and outer sealing elements 28 and 30, respectively, have fingers 210 and 212 which are resiliently biased outwardly away from the plane of the window pane in opposite directions toward the opposing sides of the U-shaped channel 72 to secure the seal assembly to the window opening along the B-pillar portion by means of frictional engagement and/or an interference fit, whereby easy installation, without the need for retaining clips or slots in the channel 72, is facilitated.

As will be readily appreciated by those of ordinary skill in the art, the disclosed cross-sectional shapes for the header portion, side portions, beltline portions, and optional downwardly depending glass run extensions, are only illustrative and can be readily modified or adapted to be used in vehicle window openings having a variety of different shapes and designs without departing from the spirit and scope of the invention. Similarly, the disclosed means for securing the seal assembly to the window and for securing the inner and outer sealing elements together to form a unitary seal assembly are only illustrative, with the various modifications and alternative means readily apparent to those of ordinary skill in the art being within the scope of the invention.

In accordance with the preferred embodiments, the inner and outer seal elements, 28 and 30 respectively, are molded of a flexible thermoplastic material, preferably EPDM rubber, which is tough and resilient, and which can be molded with smooth, low-friction surfaces which can resiliently and slidingly engage and seal the surfaces of a movable window pane.

The thermoplastic materials used to form the seal assemblies of the invention can be compounded with various conventional additives as are known in the art including antioxidants, antimicrobials, lubricants, mold release agents, plasticizers, UV stabilizers, and the like, as desired. Additionally, thermoplastic elastomers such as EPDM can be compounded with known colorants to repeatably produce seal assemblies of generally any desired color in order to color coordinate the seal assembly with the show surfaces of the vehicle, e.g. the exterior body panels of the vehicle.

In order to promote better lubricating between the movable window pane and the surfaces of the seal assembly which engage the window pane surfaces, conventional flocking materials can be applied to the window pane engaging surfaces of the seal assembly using techniques well known in the art.

The seal assemblies can also be produced with integrally formed blowout clips or mirror patches thereby eliminating the need for separate components.

In accordance with another aspect of the invention, the seal assembly is fabricated by injection molding the inner seal element and out seal element simultaneously in a mold assembly having two mold cavities separated by a removable divider plate, opening the mold to remove the divider and to apply adhesive to selected surfaces of the inner seal element, the outer seal element or both the inner and outer seal elements, and then closing the mold and bonding the two elements together to form a one-piece seal assembly adapted to provide continuous sealing engagement between the periphery of a window opening in a vehicle and the periphery of a movable window pane in the raised or closed position.

Figure 7:
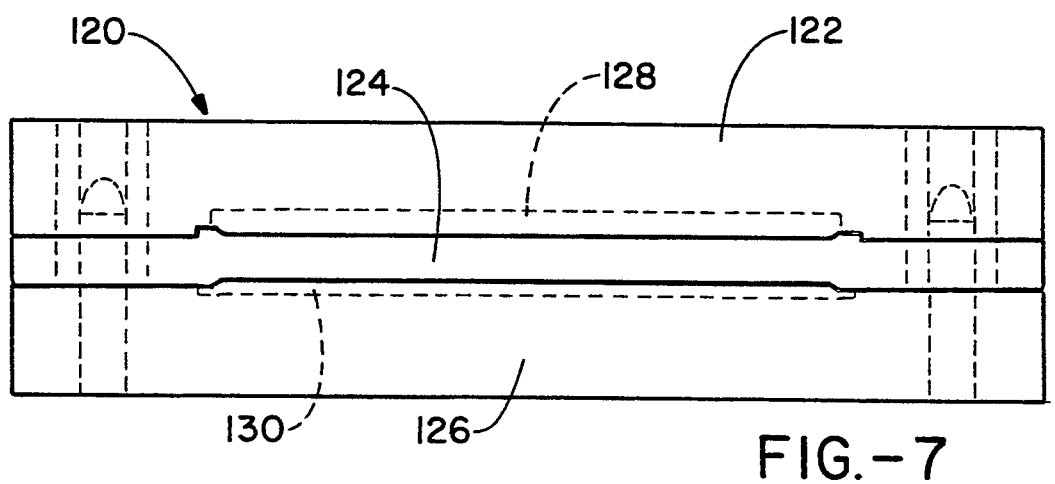
FIG. 7 is an elevational cross section of a molding apparatus for molding a seal assembly having features in accordance with the principles of the invention.

An injection press molding apparatus 120 is shown in cross section in FIG. 7. The mold generally comprises an upper die plate 122, a removable divider plate 124, and a lower die plate 126. The upper die plate and one side of the removable divider plate together define either the inner or outer seal element mold cavity 128, and the lower die plate and the other side of the removable divider plate together define the other seal element mold cavity 130. With the mold closed as shown in FIG. 7, a suitable moldable thermoplastic or thermosetting polymeric composition is substantially simultaneously injected into both of the mold cavities 128 and 130. Thermoplastic elastomers are generally preferred because they have lower molding cycle times and are more easily compounded with colorants to consistently and repeatedly produce seal assemblies having any of a wide variety of desired colors.

Figure 8:
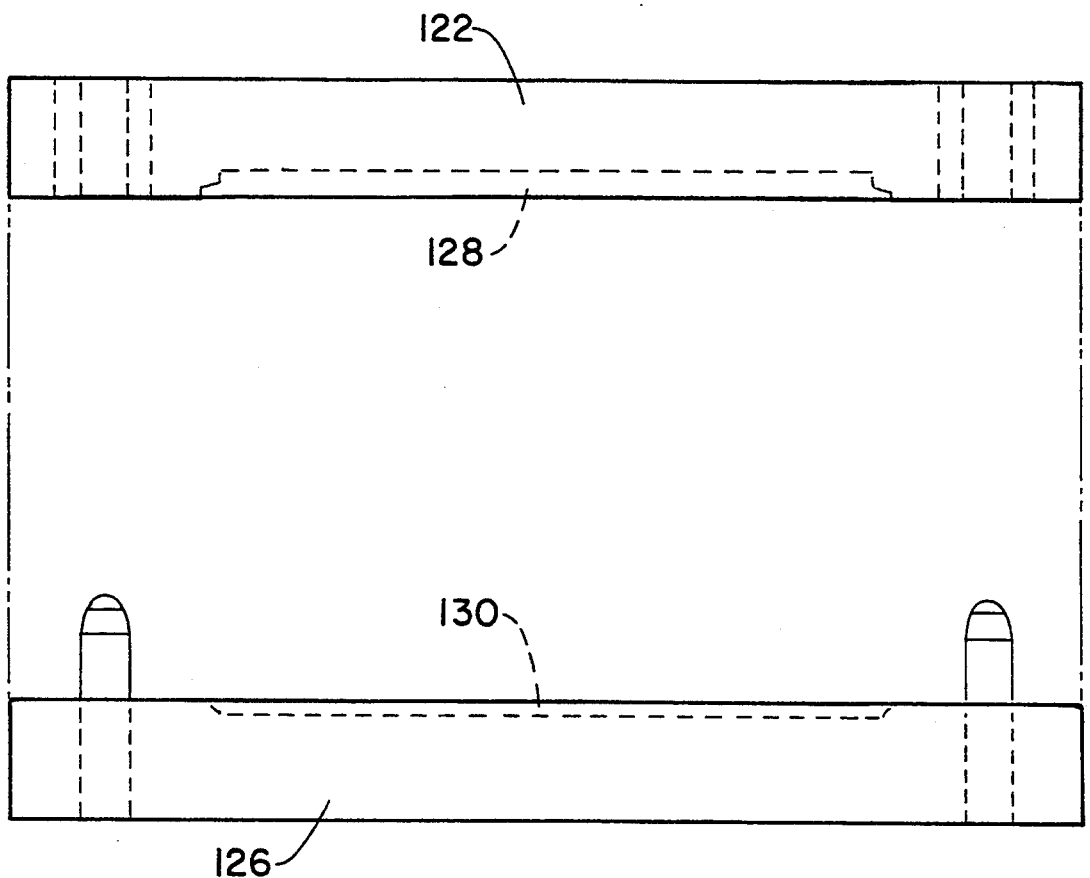
FIG. 8 is an elevational cross section of the molding apparatus of FIG. 7 with the mold open and with the divider plate removed.
Figure 10:
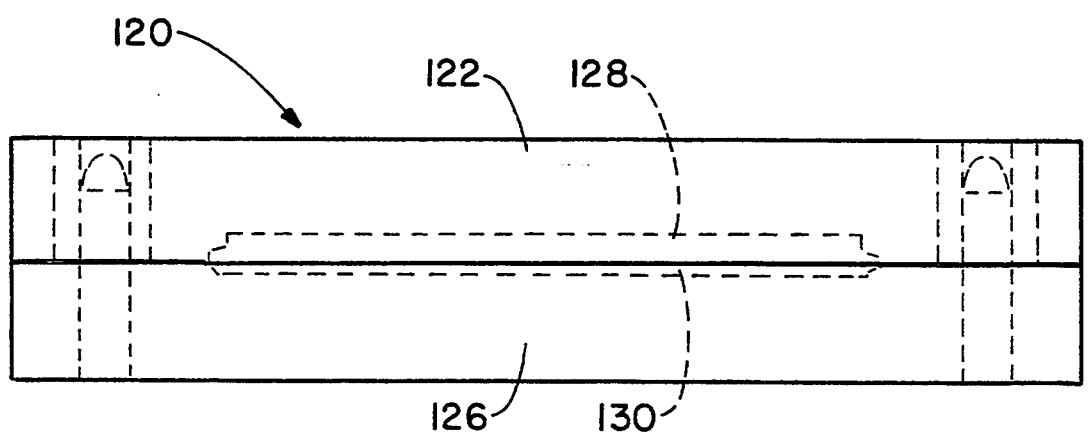
FIG. 10 is an elevational cross section of the molding apparatus of FIG. 7 showing the mold closed with the divider plate removed.
Figure 9:
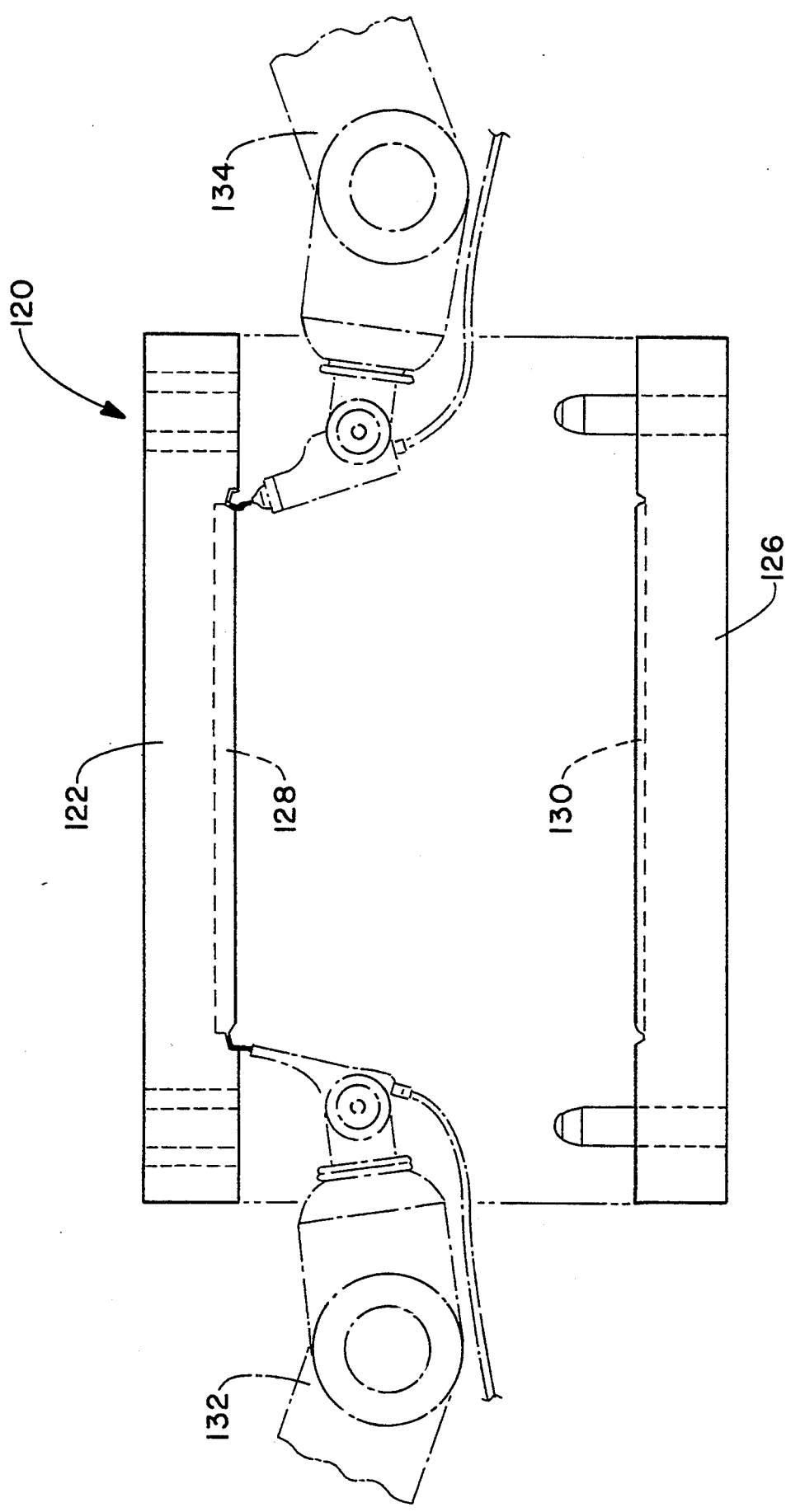
FIG. 9 is an elevational cross section of the molding apparatus of FIG. 7 with the mold open and showing robotic means for applying adhesive and optional functional coating.

After the inner and outer sealing elements have been formed, the mold is opened and the divider plate is removed as shown in FIG. 8. With the mold open, adhesive materials are then applied to selected surfaces of the inner sealing elements, outer sealing elements or both, preferably by preprogrammed robotic means 132 as shown in FIG. 9. Additionally, functional coatings such as a flocking adhesive or low friction coating can be applied at this stage, preferably by preprogrammed robotic means 134. Thereafter, the mold is again closed, as shown in FIG. 10, without the divider between the inner and outer seal dies to secure the sealing elements together. Optionally, heat can be applied to the mold to, for example, cure the adhesive if a heat curable adhesive is used, or to fuse the elements together to form a one-piece sealing assembly. The mold is then opened and the finished seal assembly is removed. Alternatively, instead of flocking, an optional low friction coating can be applied to selected surface at this stage instead of during the earlier stage before the mold is reclosed with the divider removed. The completed seal assembly is then removed from the mold and the process can then be repeated to produce additional mold assemblies.

While in accordance with the Patent Statutes, the best mode and preferred embodiment has been set forth, the scope of the invention is not limited thereto, but rather by the scope of the attached claims.

What is claimed is:

1. A window seal assembly for a movable window, comprising;

a closed-loop molded sealing member free of discontinuities adapted to be secured along the periphery of a window opening, the sealing member having inner and outer sealing elements adapted to cooperatively provide continuous sealing engagement with the interior and exterior periphery of a movable window pane.

2. A window seal assembly as set forth in claim 1, wherein the closed-loop sealing member is a pair of laterally spaced side portions, including an A-pillar side portion and a B-pillar side portion, a header portion, and a pair of spaced opposing beltline sealing strips which connect the A-pillar side portion with the B-pillar side portion, the spacing between the beltline sealing strips defining an opening through which a movable window pane can be raised or lowered.

3. A window seal assembly as set forth in claim 2, wherein the inner and outer sealing elements are each formed as a single piece having a closed-loop structure, and wherein the inner and outer sealing elements are secured together to form the seal assembly.

4. A window seal assembly as set forth in claim 3, wherein the seal assembly is formed of a resilient elastomeric material.

5. A window seal assembly as set forth in claim 3, wherein the sealing elements are molded of a thermoplastic elastomeric material.

6. A window seal assembly as set forth in claim 5, wherein the thermoplastic elastomeric material is EPDM rubber.

7. A window seal assembly as set forth in claim 5, further comprising a pair of glass run extensions each of which extend downwardly from the bottom edge of the sealinq member and are in substantial alignment respectively with said A-pillar and said B-pillar side portions, wherein said pair of glass run extensions serve as non-abrasive, low friction guide liners for promoting smooth movement of the movable window pane as it is raised or lowered.

8. A window seal assembly as set forth in claim 3, wherein one of the sealing elements has a ridge and the other has a groove which mates with the ridge to provide an interference fit which secures the sealing elements together.

9. A window seal assembly as set forth in claim 3, further comprising means for securing the seal assembly along the periphery of a window opening, the securing means including a plurality of camming projections on the header and side portions, the camming projections being adapted to engage slots of the window opening, and including a plurality of hook extensions on each of the inner and outer beltline sealing strips, the hook extensions being adapted to engage slots along the bottom of a window opening.

10. A window seal assembly as set forth in claim 3, further comprising means for securing the seal assembly along the periphery of a window opening, the securing means including a pair of fingers which are resiliently biased substantially outwardly away from the plane of the window opening in substantially opposite directions toward the opposing door panel parts defining the window opening, to secure the seal assembly to the window opening by means of frictional engagement.

* * * * *